(12) United States Patent  (10) Patent No.: US 7,815,235 B2
Hayashi et al.  (45) Date of Patent: Oct. 19, 2010

(54) TONNEAU COVER UNIT

(75) Inventors: Hironori Hayashi, Nagoya (JP);
Tomohiko Shibata, Hino (JP);
Masahiro Ideue, Toyota (JP)

(73) Assignee: Hayashi Telempu Co., Ltd., Nagoya-Shi (JP)

( * ) Notice: Subject to any disclaimer, the term of this patent is extended or adjusted under 35 U.S.C. 154(b) by 262 days.

(21) Appl. No.: 12/010,625

(22) Filed: Jan. 28, 2008

(65) Prior Publication Data

US 2008/0179022 A1    Jul. 31, 2008

(30) Foreign Application Priority Data

Jan. 30, 2007 (JP) ............... 2007-018730

(51) Int. Cl.
*B60R 5/04* (2006.01)
(52) U.S. Cl. .............. 296/24.4; 296/98; 296/100.15; 296/37.16; 160/DIG. 2
(58) Field of Classification Search ......... 296/24.4, 296/24.34, 37.16, 98, 100.15, 37.8; 280/749; 160/272, DIG. 2, DIG. 50
See application file for complete search history.

(56) References Cited

U.S. PATENT DOCUMENTS 5,415,457 A * 5/1995 Kifer .............. 297/188.04
5,685,592 A * 11/1997 Heinz .............. 296/37.16
6,402,217 B1   6/2002 Ament et al.
7,438,338 B1 * 10/2008 Schumacher et al. ....... 296/37.6
7,537,265 B2 *  5/2009 Hori et al. ............. 296/100.15
2007/0176460 A1 *  8/2007 Kodaira et al. ......... 296/100.15
2009/0195006 A1 *  8/2009 Lim ........................... 296/3

FOREIGN PATENT DOCUMENTS

JP     405139213 A  *  6/1993  .............. 296/37.16
JP     A 9-86279        3/1997

* cited by examiner

*Primary Examiner*—Jason S Morrow
(74) *Attorney, Agent, or Firm*—Oliff & Berridge, PLC

(57) ABSTRACT

A tonneau cover unit includes: a tonneau cover that covers a luggage floor which is formed on the rear side within a vehicle; a board that is fitted to an end portion of the tonneau cover, and that is provided with an engaging portion; and a rail along which the engaging portion slides in the longitudinal direction of the vehicle. The rail has a first engaged portion that locks the board at the prescribed position with the board kept substantially parallel to the luggage floor when the engaging portion is engaged in the first engaged portion; and a second engaged portion that locks the board at a prescribed position with the board kept substantially upright at a predetermined angle with respect to the luggage floor when the engaging portion is engaged in the second engaged portion.

28 Claims, 10 Drawing Sheets

TONNEAU COVER UNIT

INCORPORATION BY REFERENCE

The disclosure of Japanese Patent Application No. 2007-018730 filed on Jan. 30, 2007 including the specification, drawings and abstract is incorporated herein by reference in its entirety.

BACKGROUND OF THE INVENTION

1. Field of the Invention

The invention relates to a tonneau cover unit that is used to cover-a luggage floor within a vehicle.

2. Description of the Related Art

Japanese Patent No. 3227640 describes a retractable tonneau cover that covers a luggage boot (luggage floor) between a rear seat and a hatch of a vehicle. To cover the luggage boot, a cover sheet is pulled out of a housing case, which is arranged on the front side in the luggage boot, to the rear of the luggage boot.

When luggage is loaded into or unloaded from a luggage boot of a vehicle provided with a conventional tonneau cover, a hatch of the vehicle is opened, and a cover sheet is retracted into a housing case by a retracting force of the housing case. Then, loading or unloading of the luggage is performed in a space that is obtained after the cover sheet is retracted into the housing case. After loading or unloading of the luggage is completed, a handle member of the cover sheet is slid toward the rear of the vehicle to cover the luggage boot with the cover sheet. After that, the hatch is closed. As a result, the luggage placed in the luggage boot is invisible from the outside of the vehicle.

To load luggage into or unload luggage from the luggage boot, the hatch needs to be opened and closed. In this case, a user needs to apply a great force and a large space needs to be kept behind the vehicle in order to open and close the hatch. Therefore, it is considerably troublesome for the user to open and close the hatch each time luggage is loaded into or unloaded from the luggage boot.

To alleviate such inconvenience of opening and closing the hatch, a rear window may be provided in the hatch. The rear window is opened in order to load luggage into the luggage boot from the outside of the vehicle. However, the conventional tonneau cover causes the following inconvenience even if the rear window is provided in the hatch. To place the luggage into the luggage boot, the rear window of the hatch is opened, and the cover sheet, which has covered the luggage boot, is retracted into the housing case by a retracting force of the housing case. However, the housing case is usually arranged at a position which the user cannot reach even if he or she reaches his or her hand into the vehicle from the outside of the rear window for the housing case. Therefore, in order to cover the luggage boot with the cover sheet again, the user needs to open the hatch, enter the vehicle up to a position at which he or she can reach the housing case, and pull the cover sheet out of the housing case. After all, provision of the rear window does not save the user from having to do heavy work, that is, opening and closing the hatch.

SUMMARY OF THE INVENTION

The invention provides a tonneau cover unit with which users can easily load luggage onto or unload luggage from a luggage floor within a vehicle, or with which users can easily load luggage onto or unloaded luggage from a luggage floor through a rear window formed in a hatch without opening the hatch.

A first aspect of the invention relates to a tonneau cover unit used to cover a luggage floor that is formed on the rear side within a vehicle. The tonneau cover unit includes: a tonneau cover that covers the luggage floor; a board that is fitted to an end portion of the tonneau cover; and a rail along which an engaging portion provided to the board slides in the longitudinal direction of the vehicle. The rail has at least a first engaged portion and a second engaged portion. The first engaged portion locks the board with the board kept substantially parallel to the luggage floor when the engaging portion is engaged in the first engaged portion. The second engaged portion locks the board with the board kept substantially upright at a predetermined angle with respect to the luggage floor when the engaging portion is engaged in the second engaged portion.

With this structure, when the engaging portion of the tonneau cover is engaged in the first engaged portion of the rail, the luggage floor is covered with the tonneau cover and the board. When the engaging portion is engaged in the second engaged portion, the board stands at the predetermined angle with respect to the luggage floor. In this state, a part of the floor is not covered with the tonneau cover. As a result, it is possible to load luggage onto or unload luggage from the luggage floor through a space that is not covered with the tonneau cover.

A second aspect of the invention relates to a tonneau cover unit used to cover a luggage floor that is formed on the rear side within a vehicle. The tonneau cover unit includes: a tonneau cover that covers the luggage floor; a board that is fitted to an end portion of the tonneau cover; and a rail along which an engaging portion provided to the board slides in the longitudinal direction of the vehicle. The rail has a first engaged portion and a second engaged portion. The engaging portion is engaged in the first engaged portion. The second engaged portion is formed at a position that deviates from the first engaged portion in the longitudinal direction of the vehicle. The engaging portion is engaged in the second engaged portion. An orientation of the board when the engaging portion is engaged in the first engaged portion differs from an orientation of the board when the engaging portion is engaged in the second engaged portion.

In the second aspect of the invention, the orientation of the board when the engaging portion is engaged in the first engaged portion may differ from the orientation of the board when the engaging portion is engaged in the second engaged portion. The first engaged portion may lock the board with the board kept substantially parallel to the luggage floor when the engaging portion is engaged in the first engaged portion. The second engaged portion may lock the board with the board kept substantially upright at a predetermined angle with respect to the luggage floor when the engaging portion is engaged in the second engaged portion.

The tonneau cover unit according to each of the first aspect and the second aspect of the invention may further include a housing case that is provided at a position that is closer to the front of the vehicle than the rail is, and that retracts the tonneau cover using a predetermined retracting force and houses the tonneau cover.

In each of the first aspect and the second aspect of the invention, the engaging portion may be a projection piece that projects from an end portion of the board toward a vehicle inner wall face in which the rail is formed, and the rail may be a groove in which the projection piece is placed and along which the projection piece slides. The second engaged portion may include a step portion and a longitudinal groove. The step portion is formed by grooving the side face of the groove, at a middle portion-of the rail, by one step in the height direction of the vehicle (the direction substantially perpendicular to the direction in which the rail extends). The step portion has a size sufficiently large for the width of the projection piece in the direction substantially parallel to the board. The longitudinal groove is formed by further grooving a part of the step portion. The longitudinal groove has a width which substantially corresponds to the width of the projection piece in the thickness direction of the board. The projection piece (engaging portion) is engaged in the second engaged portion, which is formed at a middle portion of the rail, while the board is slid with the board kept substantially parallel to the luggage floor. In this process, the projection piece is first housed in the step portion, and then the projection piece is housed in the longitudinal groove, which is formed by further grooving a part of the step portion, while the board is gradually stood up.

The projection piece may be chamfered, and/or tapered in the direction in which the tonneau cover is pulled by a retracting force (toward the front of the vehicle).

At least one of the engaged portions may have a recess that is formed by grooving the engaged portion in the lateral direction of the vehicle. The board may have a projection and a switch. The projection is provided to an end portion of the engaging portion and is inserted into the recess when the engaging portion is engaged in the engaged portion. The switch changes the position of the projection between the projected position and the retracted position. With this structure, the projection is projected from the end portion of the engaging portion into the recess of the engaged portion or retracted into the end portion of the engaging portion from the recess of the engaged portion according to the operation of the switch. When the projection is inserted into the recess, the board is firmly locked at the engaged portion in which the projection piece is engaged. Meanwhile, when the projection has been retracted from the recess, the board is relatively easily released from the engaged portion.

According to the first aspect of the invention, when the board is locked at the second engaged portion and therefore the board stands up, it is possible to load luggage onto or unload luggage from the luggage floor through a predetermined amount of space at which the luggage floor is not covered with the tonneau cover. When the rear window of the vehicle hatch is opened and the board is moved from the first engaged portion to the second engaged portion, the board stops and stands up at the position to which the board is moved. Therefore, the luggage is easily loaded onto or unloaded from the luggage floor below the tonneau cover. After loading or unloading the luggage is completed, the board is moved from the second engaged portion to the first engaged portion. As a result, the luggage floor is covered with the tonneau cover again. According to the related art, the following inconvenience is caused. When the rear window is opened and luggage is loaded onto or unloaded from the luggage floor, the entirety of a tonneau cover needs to be retracted into a housing case. Then, the hatch needs to be opened and the tonneau cover needs to be pulled out of the housing case again. However, such an inconvenience is minimized according to the first aspect of the invention.

According to the second aspect of the invention, engaging the board in the second engaged portion, which is formed at a position closer to the front of the vehicle than the first engaged portion is, also makes it possible to load luggage onto or unloaded luggage from the luggage floor through the predetermined amount of space at which the luggage floor is not covered with the tonneau cover. Especially, when the rear window of the vehicle hatch is opened and the board is moved from the first engaged portion to the second engaged portion, the engaging portion is engaged in the second engaged portion. The position of the board is closer to the front of the vehicle when the engaging portion is engaged in the first engaged portion than when the engaging portion is engaged in the second engaged portion. Accordingly, a longer distance is kept between the tonneau cover and the hatch. Therefore, it becomes easier to load luggage onto or unload luggage from the luggage floor below the tonneau cover. Also, after loading or unloading of the luggage is completed, the luggage floor is covered with the tonneau cover again by moving the board from the second engaged portion to the first engaged portion.

In addition, the second engaged portion according to the second aspect of the invention may have two-step structure including the step portion and the longitudinal groove. Therefore, the engaging portion of the board is guided into the longitudinal groove more smoothly than when the longitudinal groove is directly formed at a middle portion of the rail. With this structure, when a load is applied to the board, for example, when luggage hits the board, the engaging portion, which has been housed in the longitudinal groove, climbs up onto the step portion. As a result, the board, which has been locked at the second engaged portion, is easily released. It is therefore possible to prevent damage to the engaging portion due to the load.

Because the engaging portion is chamfered, and/or tapered toward the front of the vehicle (in the direction in which the tonneau cover is pulled by a retracting force), the engaging portion is engaged in the first engaged portion or the second engaged portion more smoothly. In addition, when the load is applied to the board, the board, which has been locked at the first engaged portion or the second engaged portion, is released more easily.

The switch changes the position of the projection between the projected position and the retracted position in response to a predetermined operation. Therefore, the board is firmly locked at the engaged portion, in which the engaging portion is engaged, if needed.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Hereafter, an example embodiment of the invention will be described in the following order with reference to the accompanying drawings.

Figure 1:
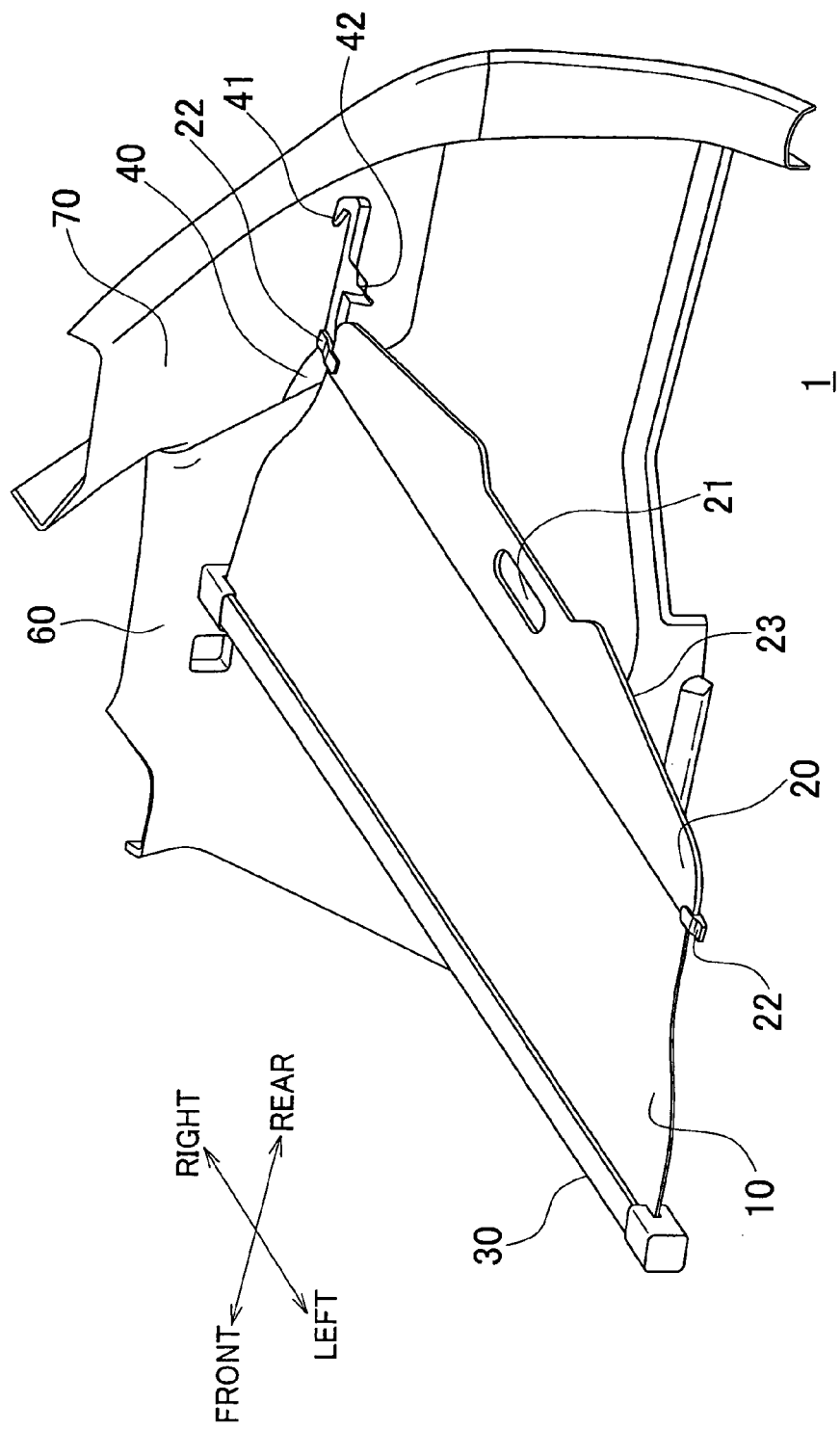
FIG. 1 is a perspective view showing the inside of a vehicle provided with a tonneau cover unit.

1) Schematic structure of tonneau cover unit
2) Manners of locking board in desired position
3) Modified examples 1) Schematic Structure of Tonneau Cover Unit FIG. 1 is a perspective view showing the inside of a vehicle provided with a tonneau cover unit 1 according to an embodiment of the invention. The tonneau cover unit 1 is arranged above a luggage floor F within the vehicle. The luggage floor F is a luggage area which is formed between a vehicle rear seat (not shown) and a vehicle hatch 50 (not shown in FIG. 1) in the longitudinal direction of the vehicle, and between a right deck side 60 and a right pillar 70, and a left deck side 60 and a left pillar 70 in the lateral direction of the vehicle. Note that, only the right deck side 60 and the right pillar 70 are shown in FIG. 1.

The tonneau cover unit 1 mainly includes a tonneau cover 10, a board 20 fitted to the rear end of the tonneau cover 10, a housing case 30, and rails 40 that guide the board 20 in the longitudinal direction of the vehicle. The tonneau cover unit 1 is provided preferably behind the vehicle rear seat.

The tonneau cover 10 is a sheet member that is used to cover the luggage floor F. Although any type of material may be employed to form the tonneau cover 10, the tonneau cover 10 is made of, preferably, soft material so that the tonneau cover 10 can be easily rolled and housed in the housing case 30. For example, vinyl chloride leather and soft polyvinyl chloride, which are widely used, may be employed to form the tonneau cover 10.

The housing case 30 is arranged behind the seat (not shown), and constantly pulls the tonneau cover 10 toward the front of the vehicle using a predetermined retracting force of biasing means (e.g. a spring) provided inside the housing case 30.

The board 20 is fitted to the rear end portion (rear edge portion) of the tonneau cover 10, which faces the rear of the vehicle. The board 20 is made of, preferably, hard material. For example, the board 20 may be made of hard resin. A handle portion 21 is formed at substantially the center of the board 20. Further, the board 20 has right and left projection pieces (engaging portions) 22. The right and left projection pieces 22 are provided at the right and left ends of the board 20 so that the right and left projection pieces 22 face the right and left wall faces of the vehicle, respectively.

The handle portion 21 is a hole that passes through the board 20. A user puts his or her hand in the handle portion 21 and slides the board 20 and the tonneau cover 10 in the longitudinal direction of the vehicle. The right and left projection pieces 22 move within the right and left rails 40, respectively, when the board 20 slides.

The rails 40 are grooves that are formed within the inner wall faces of the vehicle, which are on the right and left sides of the tonneau cover 10. The rails 40 extend roughly along the direction in which the tonneau cover 10 is pulled by a retracting force (in the longitudinal direction of the vehicle). In the embodiment, the rails 40 are formed within the right and left pillars 70. The distance between the right and left pillars 70 is shorter than the distance between the right and left deck sides 60. The rails 40 extend toward the rear of the vehicle from the predetermined positions within the inner wall faces that are on the right and left sides of the tonneau cover 10. From the predetermined positions, the pillars 70 extend toward the rear of the vehicle.

The right and left rails 40 are the same in shape and symmetrically arranged. Each rail 40 has multiple engaged portions in which the projection piece 22 is engaged. In the embodiment, each rail 40 has at least a lateral engaged portion 41 and a longitudinal engaged portion 42.

When the tonneau cover 10 is housed in the housing case 30, the user pulls the board 20 from the housing case 30 up to the pillar 70. Then, the user places the projection pieces 22 in the rails 40 and further moves the board 20 along the rails 40. The user then engages the projection pieces 22 in desired engaged portions, thereby locking the board 20 at the desired engaged portions.

2) Manners of Locking Board in Desired Position

Figure 2:
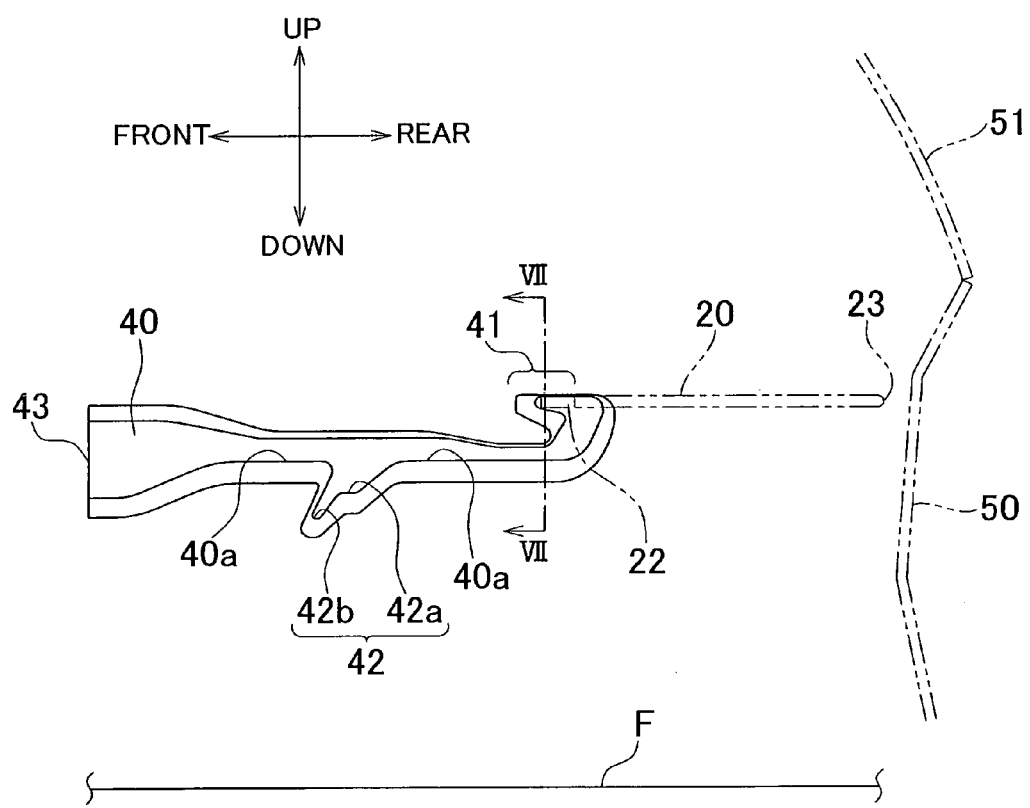
FIG. 2 is a view showing the state in which a projection piece is engaged in a lateral engaged portion of a rail.

FIG. 2 shows the position of the projection piece 22 within the rail 40, etc. FIG. 2 also shows the positional relationship between the inner face of the hatch 50 (indicated by the chain double-dashed line) and the rail 40, and the positional relationship between a rear window 51 (indicated by the chain double-dashed line), which is a part of the hatch 50, and the rail 40. The rear window 51, which can be opened and closed, is formed in the hatch 50.

The rail 40 extends from an entrance 43, which faces the front of the vehicle, substantially horizontally toward the rear of the vehicle. At the rearmost end, the rail 40 starts extending substantially upward. At the uppermost end, the rail 40 starts extending toward the front of the vehicle. The rail 40 extends toward the front of the vehicle by the length that is required to house the projection piece 22 substantially completely. In the embodiment, this groove portion that extends toward the front of the vehicle may be the lateral engaged portion 41.

In addition, the rail 40 has the longitudinal engaged portion 42 at a middle portion of the portion that extends from the entrance 43 substantially horizontally toward the rear of the vehicle. The longitudinal engaged portion 42 includes a step portion 42a and a longitudinal groove 42b. The step portion 42a is formed by grooving a side face 40a, which defines the groove of the rail 40, by one step in the height direction of the vehicle (the direction substantially perpendicular to the direction in which the rail 40 extends) (downward in FIG. 2). The longitudinal groove 42b is formed by further grooving a part of the step portion 42. In the embodiment, the longitudinal engaged portion 42 is formed at a position closer to the front of the vehicle than the lateral engaged portion 41 is.

In FIG. 2, the position of the end portion of the projection piece 22 placed within the rail 40 is indicated by the chain double-dashed line. In the state shown in FIG. 2, the projection piece 22 is engaged in the lateral engaged portion 41. The board 20 is pulled until the projection pieces 22 reach the rearmost ends of the rails 40 with the board 20 (more specifically, the face of the board 20) kept substantially horizontal, the board 20 is lifted slightly upward and the projection pieces 22 are guided into the lateral engaged portions 41, and then the projection pieces 22 are engaged in the lateral engaged portions 41. As a result, the board 20, to which a retracting force is constantly applied from the housing case 30, is locked at the position at which the projection pieces 22 are engaged in the lateral engaged portions 41. Note that, the tonneau cover 10 is not shown in FIG. 2 (and FIGS. 4 and 5 described later in detail).

Figure 3:
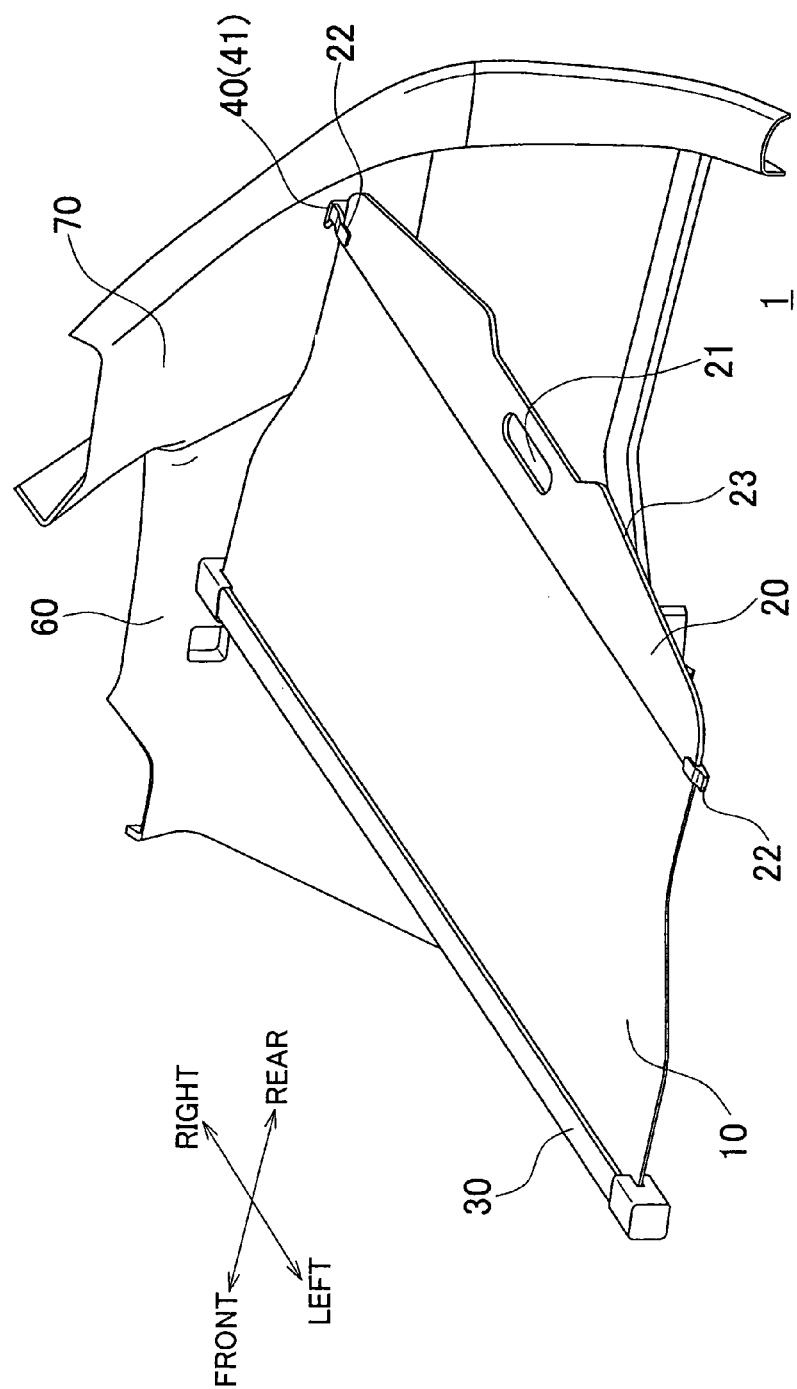
FIG. 3 is a view showing the inside of the vehicle when a board is in the regular locked state.

FIG. 3 shows the board 20 and the tonneau cover 10 in the state in which the projection pieces 22 are engaged in the lateral engaged portions 41 as shown in FIG. 2. Hereinafter, the state in which the projection pieces 22 are engaged in the lateral engaged portions 41 will be referred to as the "regular locked state". In the embodiment, the lateral engaged portions 41 are shaped in such a manner that the projection pieces 22 are appropriately engaged in the lateral engaged portions when the board 20 is placed substantially horizontally. Accordingly, in the regular locked state, the board 20 as well as the tonneau cover 10 extends substantially horizontally. The luggage floor F is covered with the board 20 and the tonneau cover 10. In this state, an end 23 of the board 20 is considerably close to the hatch 50, as can be seen from FIG. 2. Therefore, the luggage floor F is invisible substantially completely from the outside of the vehicle.

Figure 4:
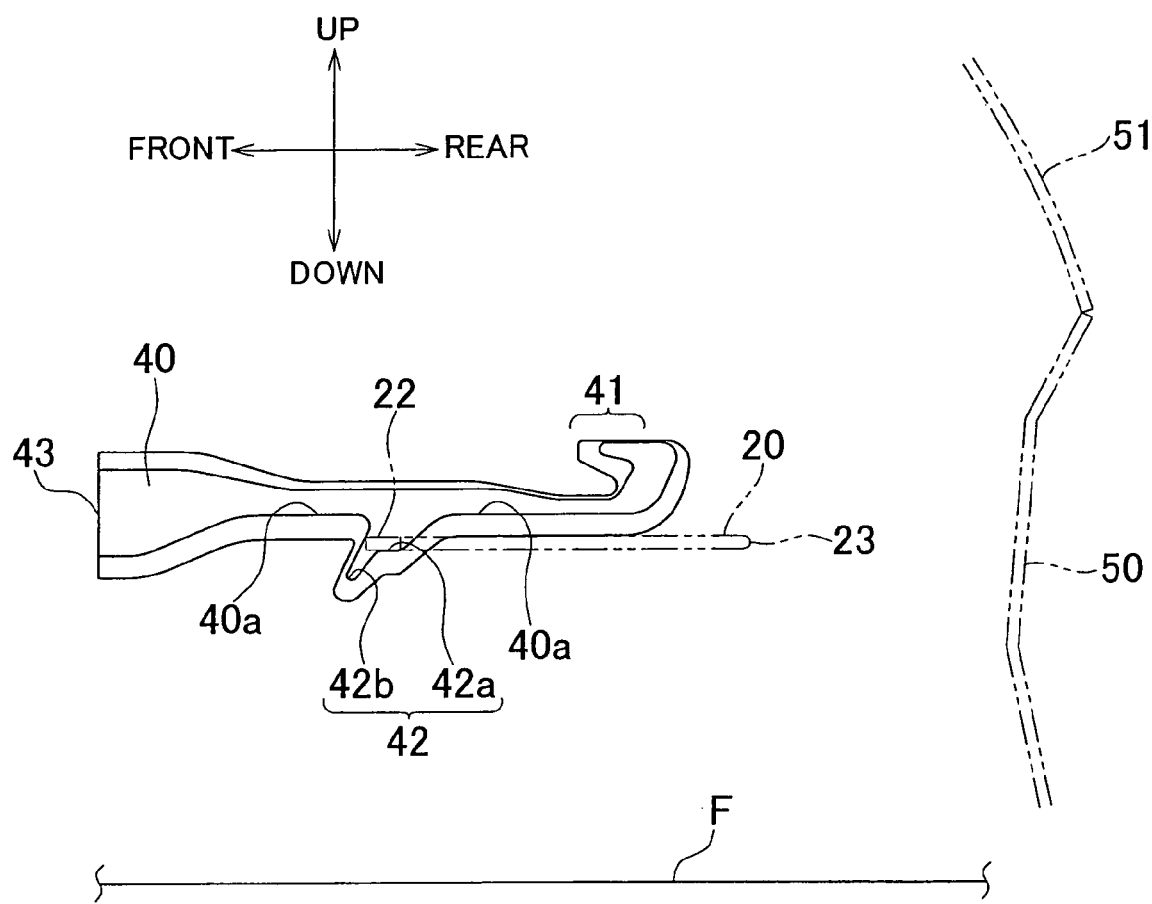
FIG. 4 is a view showing the process of engaging the projection piece in a longitudinal engaged portion of the rail.
Figure 5:
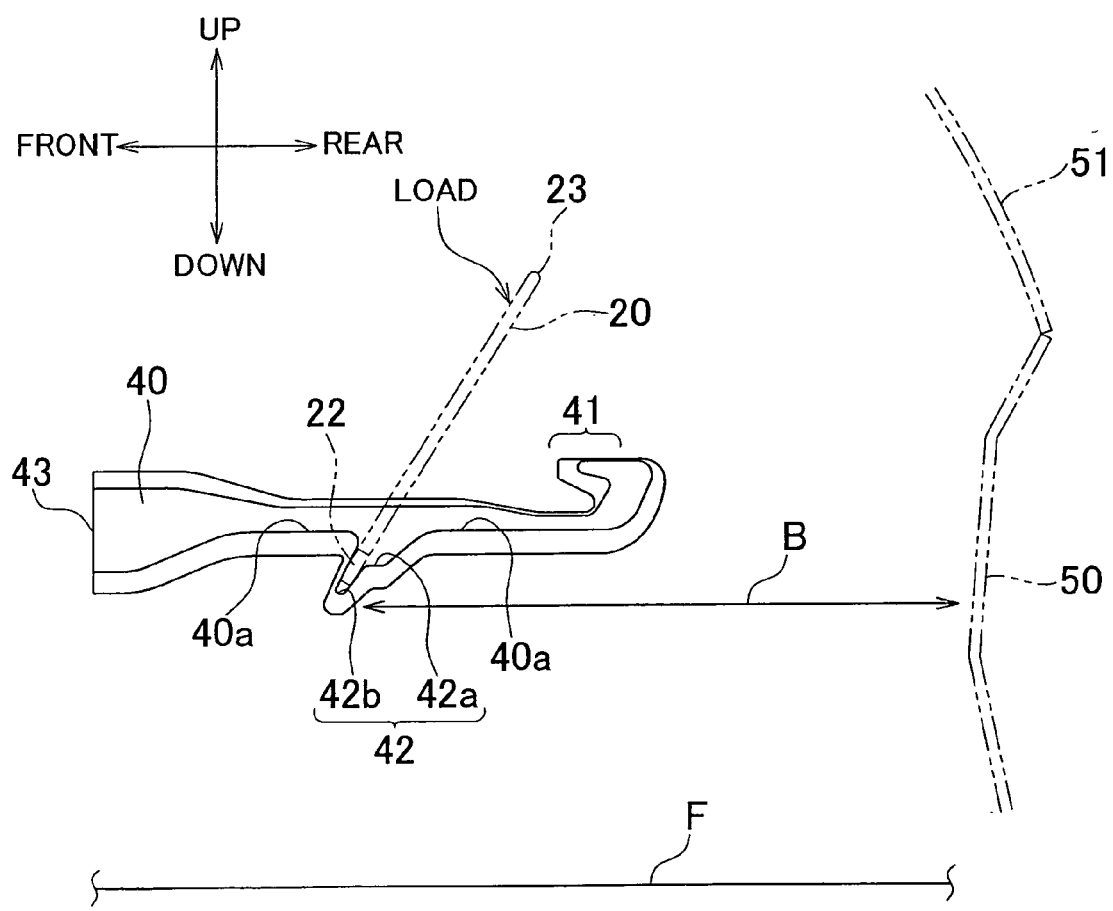
FIG. 5 is a view showing the state in which the projection piece is engaged in the longitudinal engaged portion of the rail.

FIGS. 4 and 5 show the process of engaging the projection piece 22 in the longitudinal engaged portion 42.

For example, to move the board 20, which has been in the regular locked state, to the longitudinal engaged portions 42, the projection pieces 22 of the board 20 are disengaged from the lateral engaged portions 41 and guided along the rails 40 toward the entrances 43. Then, the board 20 is moved slightly downward at the position at which the step portions 42a are formed, and the projection pieces 22 are housed in the step portions 42a. Each step portion 42a is sufficiently large for the width of the projection piece 22 in the direction substantially parallel to the board 20. Therefore, it is possible to house the projection piece 22 in the step portion 42a with the board 20 kept substantially horizontal (see FIG. 4).

After the projection pieces 22 are housed in the step portions 42a, the projection pieces 22 are engaged in the longitudinal grooves 42b. The width of the entrance of the longitudinal groove 42b is formed into a size that substantially corresponds to the width of the projection piece 22 in the thickness direction of the board 20. In addition, the projection piece 22 is formed in such a manner that the width of the projection piece 22 in the direction substantially parallel to the board 20 is larger than the width of the projection piece 22 in the thickness direction of the board 20. Accordingly, in order to engage the projection pieces 22 in the longitudinal grooves 42b, the projection pieces 22 are inserted into the longitudinal grooves 42b while the board 20 is gradually stood up so that the end portion 23 of the board 20 faces upward. As a result, the projection pieces 22 are engaged in the longitudinal grooves 42b, and the board 20 is locked at the longitudinal engaged portions 42. At this time, the board 20 stands up at a determined angle with respect to the luggage floor F (see FIG. 5) instead of extending substantially horizontally.

Figure 6:
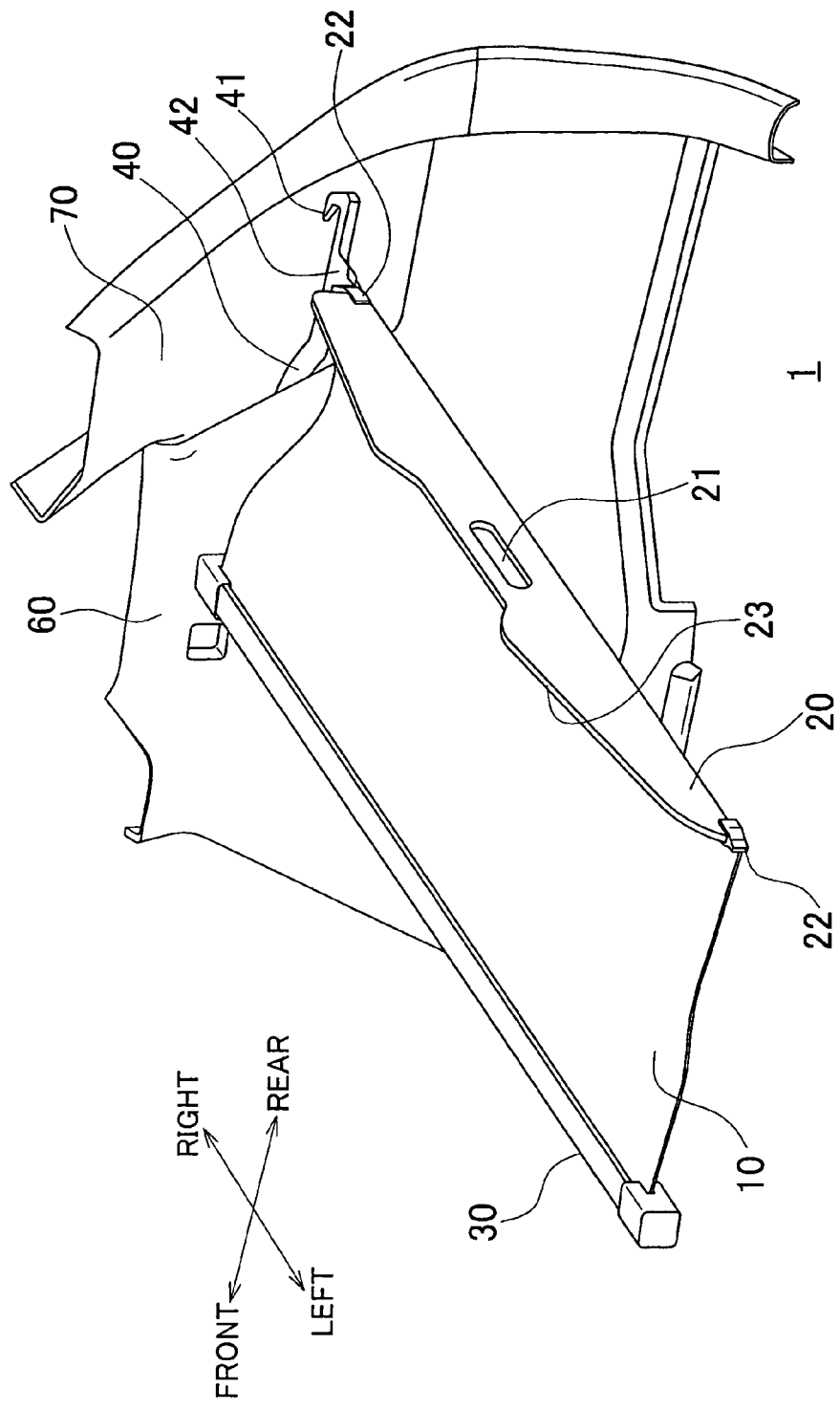
FIG. 6 is a perspective view showing the inside of the vehicle when the board is in the longitudinal locked state.

FIG. 6 shows the board 20 and the tonneau cover 10 in the state in which the projection pieces 22 are engaged in the longitudinal engaged portions 42. Hereinafter, the state in which the projection pieces 22 are engaged in the longitudinal engaged portions 42 will be referred to as the "longitudinal locked state". As shown in FIG. 6, the board 20 is locked in a substantially upright position, at a position farther from the hatch 50 in the longitudinal locked state, than in the regular locked state.

Namely, in the longitudinal locked state, a part of the luggage floor F is exposed. Therefore, luggage can be loaded onto or unloaded from the luggage floor F through an opening B (see FIG. 5) that is formed in the longitudinal locked state. In addition, the opening B is wider and therefore luggage is loaded onto or unloaded from the luggage floor F more easily when the board 20 is locked in a substantially upright position, at the position that is reached by sliding the board 20 from the lateral engaged portions 41 toward the front of the vehicle by a predetermined distance, than when the board 20 is locked while extending substantially horizontally at a position that is reached by sliding the board 20 from the lateral engaged portions 41 by the predetermined distance.

The structure according to the embodiment of the invention described above is especially effective when luggage is loaded onto or unloaded from the luggage floor F through the rear window 51. The reason will be described below in detail. When the rear window 51 is opened while the luggage floor F is entirely covered with the tonneau cover 10 and the board 20, the board 20 is locked at the lateral engaged portions 41. In this case, the user can move the board 20, which has been locked at the lateral engaged portions 42, to lock it at the longitudinal engaged portions 42. Then, the luggage is loaded onto or unloaded from the luggage floor F through the opening B formed near the rear window 51. After loading or unloading of the luggage is completed, the position at which the board 20 is locked is changed from the longitudinal engaged portions 42 to the lateral engaged portions 41 to return the board 20 from the longitudinal locked state to the regular locked state.

With the structure of a conventional tonneau cover, the board 20, which has been brought out of the regular locked state, is pulled back, by a retracting force of the housing case 30, to the housing case 30, which is at a position that the user cannot reach even he or she reaches his or her hand through the rear window 51 for the housing case 30. However, according to the embodiment, it is possible to lock the board 20, which has been brought out of the regular locked state, at the longitudinal engaged portions. 42, which the user can reach, instead of pulling back the board 20 to the housing case 30. Therefore, it is no longer necessary to open the hatch 50 from the rear to pull the board 20 from the housing case 30 again. Accordingly, in order to load luggage onto or unload luggage from the luggage floor F, it is necessary to just open and close the rear window 51 and change the position, at which the board 20 is locked, between the lateral engaged portions 41 and the longitudinal engaged portions 42.

When ease in the user's moving the board 20 is taken into account, the distance from the inner face of the hatch 50 to the longitudinal engaged portion 42 is, preferably, approximately 30 centimeters at the longest.

In the embodiment, because the board 20 is made of hard material, a certain weight of luggage can be placed on the board 20 in the regular locked state. In addition, if the tonneau cover 10 is formed of relatively hard material, light luggage can be placed on the tonneau cover 10. In the longitudinal locked state, the board 20 prevents the luggage placed on the tonneau cover 10 from dropping. In other words, as the spaces for housing luggage, two spaces, that is, the space below the tonneau cover 10 and the space above the tonneau cover 10 are provided.

The board 20 in the longitudinal locked state may be perpendicular to the board 20 in the regular locked state, or may be slightly oblique with respect to the board 20 in the regular locked state. For example, the angle which the board 20 in the longitudinal locked state forms with respect to the board 20 in the regular locked state may be any value from 60 degrees to 120 degrees. This angle may be adjusted by adjusting the direction in which the vertical grooves 42b are grooved or the shape of the projection pieces 22.

In one rail 40, not only one lateral engaged portion 41 and one longitudinal engaged portion 42 but also any types and any numbers of engaged portions may be formed. In addition, not only these two types of engaged portions but also another type of engaged portions may be formed. The other type of engaged portions are used to lock the board 20 at an angle with respect to the luggage floor F, which is different from the angles at which the board 20 is locked at the lateral engaged portions 41 and the longitudinal engaged portions 42.

In the embodiment, the end portion 23 of the board 20 faces upward (the ceiling of the vehicle) in the longitudinal locked state. Alternatively, the end portion 23 of the board 20 may face downward (the luggage floor F) in the longitudinal locked state.

In the embodiment, various measures are taken in order to make it easier to engage the projection pieces 22 in the engaged portions and disengage the projection pieces 22 from the engaged portions.

As described above, the longitudinal engaged portion 42 has the two-step structure formed of the step portion 42a and the longitudinal groove 42b. Therefore, in order to slide the board 20 to guide the projection pieces 22 to the longitudinal grooves 42b, the projection pieces 22 are housed in the step portions 42a with the board 20 kept substantially horizontal, and the positions of the projection pieces 22 are roughly set. Then, the projection pieces 22 are guided into the longitudinal grooves 42b while the board 20 is gradually stood up using the projection pieces 22 as the pivots. In other words, the projection pieces 22 are guided into the longitudinal grooves 42b to bring the board 40 into the longitudinal locked state more smoothly and easily when the longitudinal engaged portions 42 have the two-step structure described above, than when the longitudinal grooves 42b are directly formed in the middle portions of the rails 40 without step portions.

When it is difficult to bring the board 20 out of the longitudinal locked state, if heavy luggage hits the board 20 in the longitudinal locked state, a considerably heavy load is applied to the projection pieces 22. In some cases, the projection pieces 22 are broken. However, the two-step structure according to the embodiment makes it easier to bring the board 20 out of the longitudinal locked state when an external impact is applied to the board 20. More specifically, because the step portions 42a are present between the longitudinal grooves 42b and the side faces 40a of the rails 40, the projection pieces 22, which have been engaged in the longitudinal grooves 42b, more easily climb up onto the step portions 42a when a certain impact is applied to the board 20. For example, when a load, directed in the direction of the arrow in FIG. 5, is applied to the board 20 at a position near the end portion 23, the projection pieces 22 gradually move out of the longitudinal grooves 42b and climb up onto the step portions 42a as the board 20 topples over. That is, the board 20 is gradually changed from the state in FIG. 5 to the state in FIG. 4 as the board 20 topples over. Because a retracting force is constantly applied to the board 20 to attract the board 20 toward the housing case 30, the board 20 of which the projection pieces 22 are housed in the step portions 42, which are shallow recesses formed by grooving the side faces 40a by a small amount, are easily moved out of the longitudinal engaged portions 42 by the retracting force. As described above, when a load is applied to the board 20, the board 20, which has been locked at the longitudinal engaged portions 42, is easily released. Therefore, it is possible to prevent the projection pieces 22 from being broken by the impact. If the width of the projection piece 22 in the direction parallel to the board 20 is longer than the distance from the depth position of the step portion 42a to the deepest position of the longitudinal groove 42b, the projection piece 22 further easily climbs up onto the step portion 42a.

In addition, it is possible to make it easier to engage the projection piece 22 in each engaged portion and disengage the projection piece 22 from each engaged portion by adjusting the shape of the projection piece 22. For example, the projection piece 22 may be chamfered. If the projection piece 22 is smoothly chamfered, the projection piece is more smoothly engaged in or disengaged from each engaged portion.

In addition, the projection piece 22 may be tapered in the direction in which the tonneau cover 10 is pulled by a retracting force (i.e., toward the front of the vehicle). More specifically, the vehicle-front-side end portion of the projection piece 22 may be tapered. Because a retracting force is constantly applied to the board 20 to attract the board 20 toward the housing case 30, tapering the vehicle front-side end portion of the projection piece 22 makes it easier to engage the projection piece 22 into or disengage the projection piece 22 from the lateral engaged portion 41 and the longitudinal groove 42b of the longitudinal engaged portion 42.

3) Modified Examples

In the embodiment, importance is placed on ease in disengaging the projection pieces 22 from the engaged portions. However, the projection pieces 22 need to be more firmly engaged in the engaged portions in other embodiments. Therefore, a retractable projection may be provided to each projection piece 22 and the projection may be inserted in a recess formed within each rail 40, whereby the projection piece 22 is firmly engaged in the engaged portion.

Figure 7:
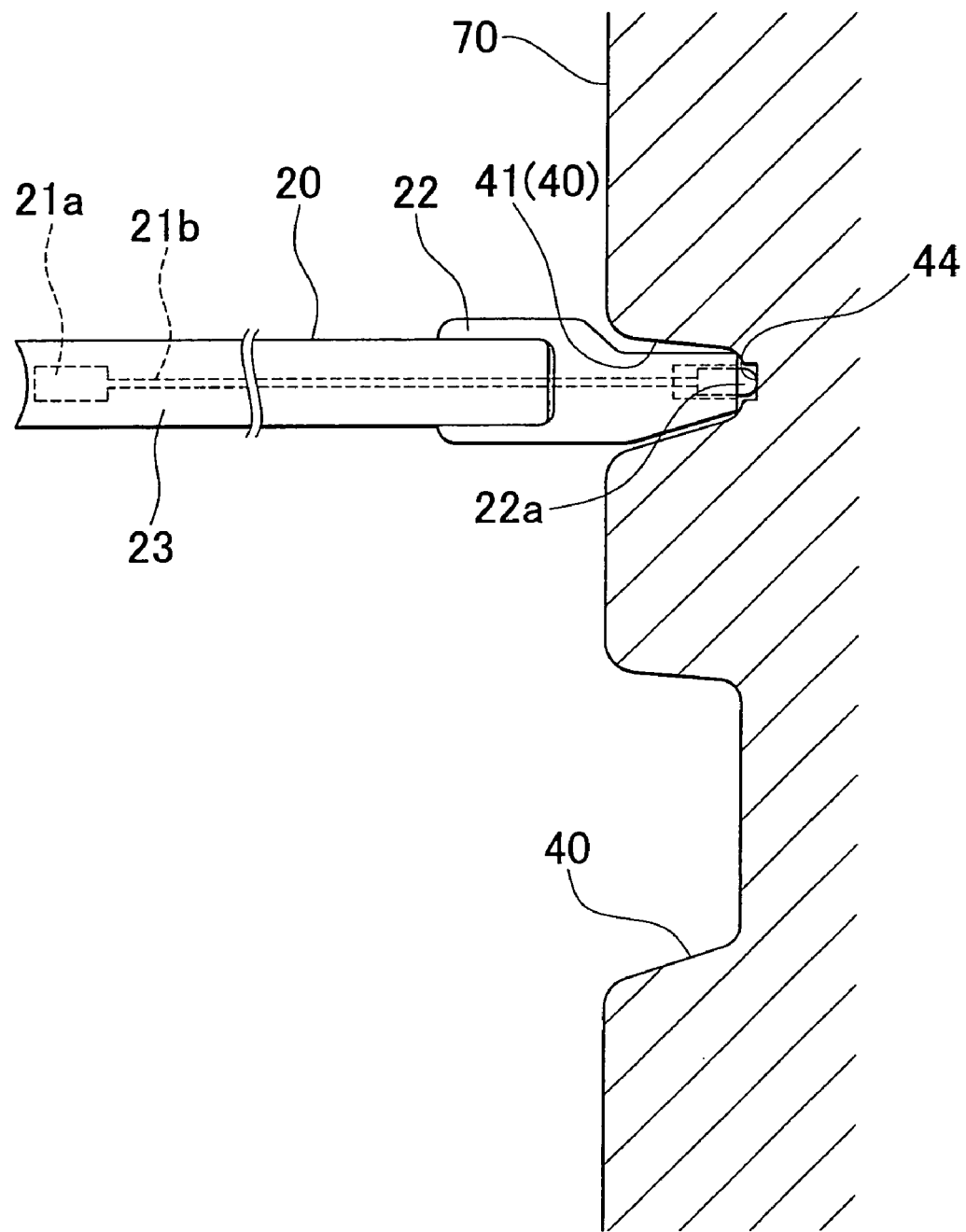
FIG. 7 is a view showing a recess formed in the lateral engaged portion and a projection provided to the projection piece.

FIG. 7 shows an example of the retractable projection. FIG. 7 shows a cross-section of the rail 40 taken along the line VII-VII in FIG. 2, and the left projection piece 22 that is engaged in the lateral engaged portion 41. As shown in FIG. 7, a projection 22a that is retractable in the direction perpendicular to the direction, in which the board 20 slides (e.g., in the lateral direction of the vehicle in the embodiment) is formed at the end portion of the projection piece 22. A recess 44, which is formed by grooving the lateral engaged portion 41 in the direction in which the projection 22a projects, is formed in the lateral engaged portion 41 at the face that faces the end of the projection piece 22. The recess 44 is formed into an appropriate so that the projection 22a can be housed into the recess 44. The projection 22a is provided also to the right projection piece 22 (not shown), and the recess 44 is formed also in the right rail 40 (not shown).

A switch 21a that is operated by the user is provided at a predetermined position of the board 20. The switch 21a is operated easily if it is provided on, for example, the inner periphery of the handle portion 21. The switch 21a and the projection 22a are connected to each other by a connecting member 21b that passes through the board 20 and the projection piece 22. The position of the projection 22a is changed between the projected position and the retracted position in response to a predetermined operation of the switch 21a. The projection 22a is projected from the end of the projection piece 22 into the recess 44 by operating the switch 21a when the projection piece 22 is engaged in the lateral engaged portion 41. By inserting the projections 22a into the recesses 44, the board 20 is firmly locked at the lateral engaged portions 41, and the board 20 is prevented from being disengaged from the lateral engaged portions 41 due to, for example, vibration of the vehicle. To release such firm engagement, the switch 21a is operated to retract the projections 22a from the recesses 44. The recess 44 may also be formed in the face that defines the longitudinal groove 42b, which faces the end portion of the projection piece 22 when the projection piece 22 is engaged in the longitudinal engaged portion 42. The recess 44 may be formed at a desired position in the rail 40 other than each engaged portion described above to lock the board 20 at the desired position. In this structure, the projection 22a that is retractable from the end of the projection piece 22 is provided. Alternatively, the projection piece 22 itself may be made retractable from the side end of the board 20.

Various measures may be taken to the board 20 in order to effectively use the board 20 in the longitudinal locked state. For example, a member that supports the luggage placed on the luggage floor F may be provided to the board 20.

Figure 8:
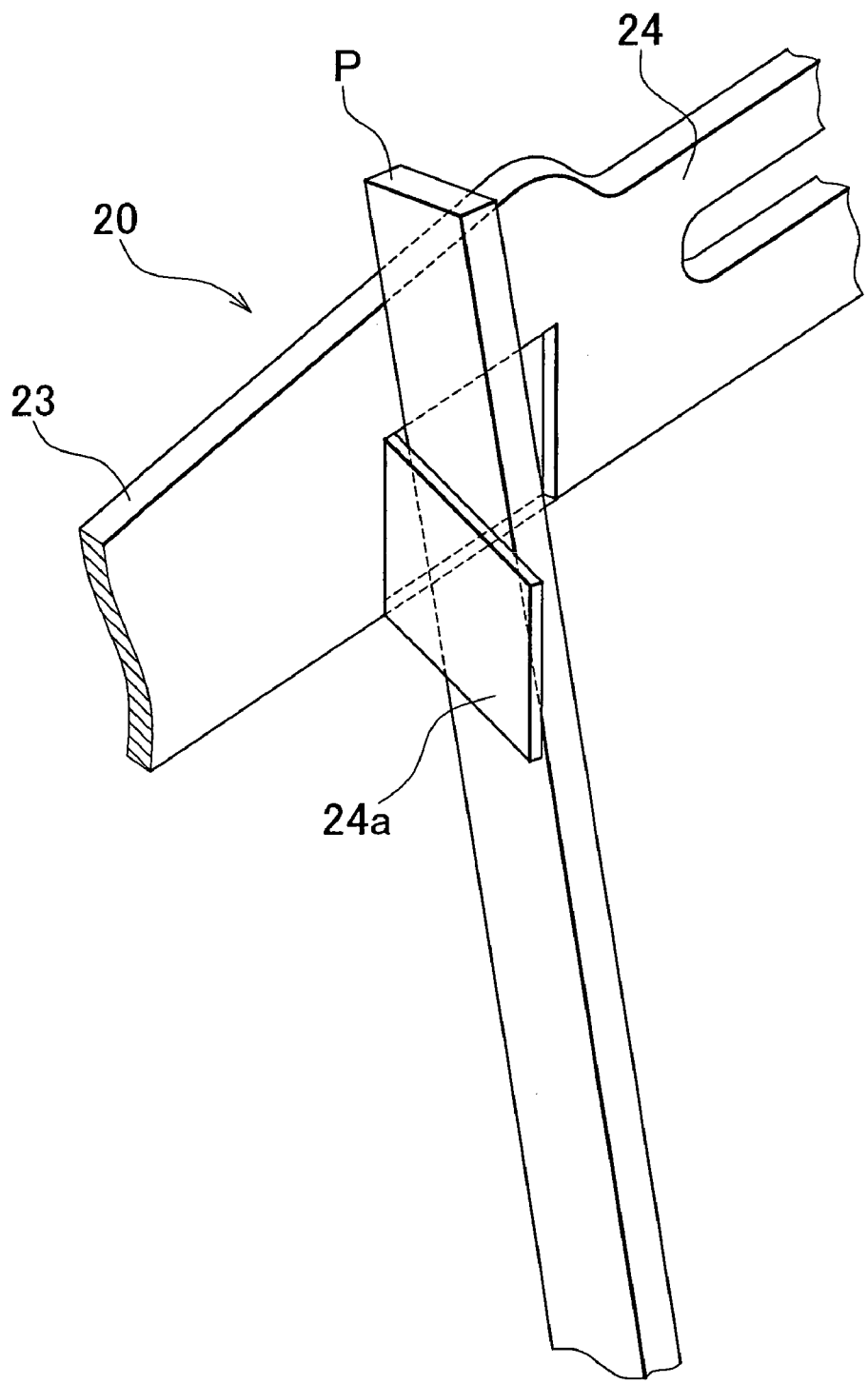
FIG. 8 is a perspective view showing a supporting board provided to the board.

FIG. 8 shows an example of the face of the board 20, which faces the rear of the vehicle when the board 20 is in the longitudinal locked state (hereinafter, referred to as "face 24"). In FIG. 8, a supporting board (opening/closing board) 24a is provided to the face 24.

The supporting board 24a is pivotally fixed, at one end, to the face 24 by a hinge (not shown), and therefore the supporting board 24a can be opened up to the position at which the supporting board 24a is substantially perpendicular to the face 24. When the supporting board 24a is substantially perpendicular to the face 24, the supporting board 24a extends substantially parallel to the right and left wall faces of the vehicle. With the structure described above, when the board 20 is in the longitudinal locked state and tall luggage P, of which the height from the luggage floor F exceeds the distance between the luggage floor F and the tonneau cover 10, is placed in the luggage boot, the luggage P is supported by the supporting board 24a that is opened as shown in FIG. 8. Instead of the supporting board 24a, any types of projection, recess or rib may be provided to the face 24 to support tall luggage.

Figure 9:
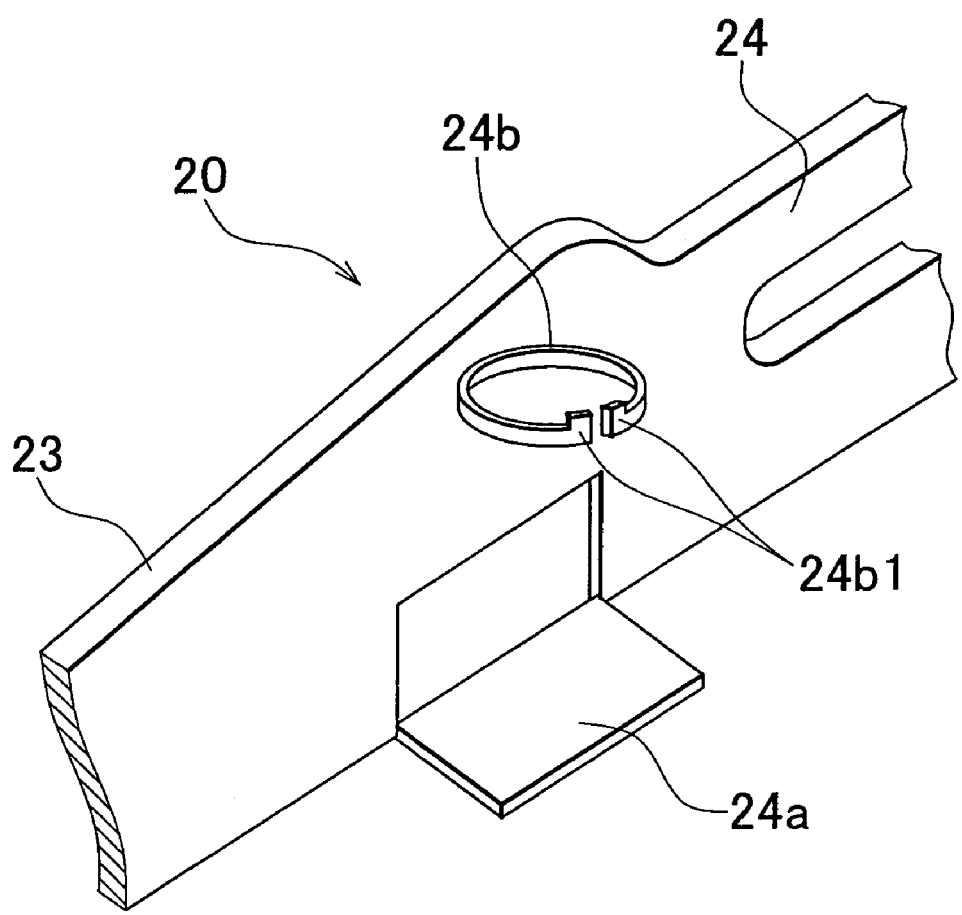
FIG. 9 is a perspective view showing a hook, etc. provided to the board.

FIG. 9 shows another example of the face 24. In FIG. 9, a hook 24b, over which luggage is hooked, is fixed to the face 24. The hook 24b is an example of an accessory. The hook 24b has a shape formed by cutting off a part of a substantially cylindrical member when viewed from above. Hooking projections 24b1, which extend in the direction perpendicular to the radial direction of the circular cross-section of the cylindrical member, may be formed at respective ends that define the space formed by partially cutting off the cylindrical member. It is possible to hook, for example, a shopping bag, over the hook 24b using the hooking projections 24b1 as catches. In addition, the hook 24b may be used as a holder for, for example, a container of beverage. In some cases, the container drops because the diameter of the hook 24b is not small enough to firmly support the container using only the hook 24b. Therefore, a supporting board 24c, which can be opened up to a position at which the supporting board 24c forms 90 degrees with the supporting board 24a as shown in FIG. 8, may be provided to the face 24 at a position below the hook 24b. In this way, the bottom of the container held within the hook 24b is supported by the supporting board 24c.

Figure 10:
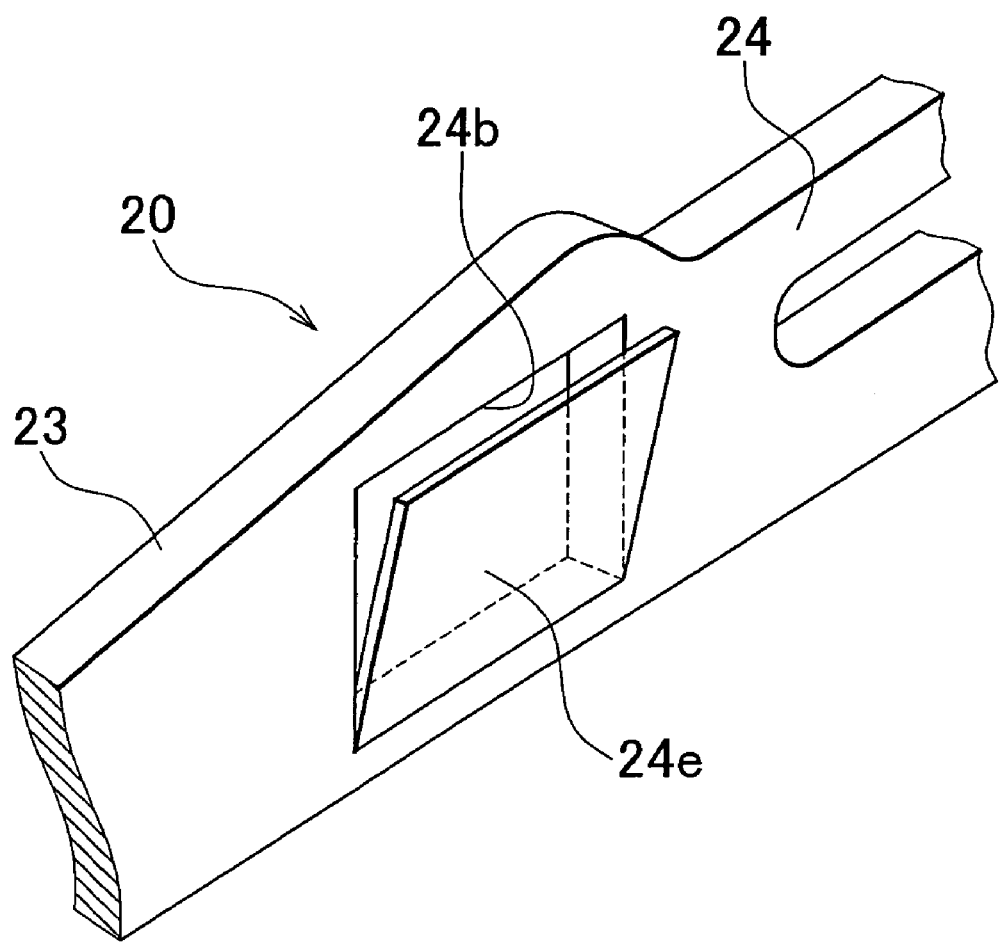
FIG. 10 is a perspective view showing a housing space, etc. formed within the board.

FIG. 10 shows another example of the face 24. In FIG. 10, a housing space 24d, which opens at the face 24, is formed within the board 20. In order to form the housing space 24d within the board 20, the board 20 needs to have a certain thickness. With this structure, when the board 20 is in the longitudinal locked state, a small article can be housed in the housing space 24d within the board 20 instead of being placed on the luggage floor F. In this way, the user can more easily reach the small article when the user reaches his or her hand through the rear window 51 for the small article. As shown in FIG. 10, a lid 24e that covers the opening of the housing space 24d may be provided. Any member may be used as the lid 24e as long as the member opens and closes the opening. For example, a member having the same structure as the supporting board 24a or the supporting board 24c may be used. Each of the structures shown in FIGS. 7 to 10 may be employed by itself. Alternatively, all or some of the structures shown in FIGS. 7 to 10 may be employed in combination.

What is claimed is:

1. A tonneau cover unit, comprising:
a tonneau cover that covers a luggage floor which is formed on a rear side within a vehicle;
a board that is fitted to an end portion of the tonneau cover, and that is provided with an engaging portion;
a rail along which the engaging portion of the board slides in a longitudinal direction of the vehicle; and
a housing case that is provided at a position which is closer to a front of the vehicle than the rail is, and that retracts the tonneau cover using a predetermined retracting force and houses the tonneau cover,
wherein the rail has:
a first engaged portion that locks the board with the board kept substantially parallel to the luggage floor when the engaging portion is engaged in the first engaged portion; and
a second engaged portion that locks the board with the board kept substantially upright at a predetermined angle with respect to the luggage floor when the engaging portion is engaged in the second engaged portion.

2. The tonneau cover unit according to claim 1, wherein;
the engaging portion is a projection piece that projects from an end portion of the board toward a vehicle inner wall face in which the rail is formed;
the rail is a groove in which the projection piece is placed and along which the projection piece slides; and
the second engaged portion includes:
a step portion that is formed by grooving a side face of the groove, at a middle portion of the rail, by one step in a height direction of the vehicle, and that has a size sufficiently large for a width of the projection piece in a direction substantially parallel to the board; and
a longitudinal groove that is formed by further grooving a part of the step portion, and that has a width which substantially corresponds to a width of the projection piece in a thickness direction of the board.

3. The tonneau cover unit according to claim 2, wherein the projection piece is chamfered.

4. The tonneau cover unit according to claim 2, wherein a vehicle-front-side end portion of the projection piece is tapered.

5. The tonneau cover unit according to claim 1, wherein;
at least one of the first engaged portion and the second engaged portion has a recess that is formed by grooving the engaged portion in a direction substantially perpendicular to a direction in which the engaging portion slides; and
the board has:
a projection that is provided to an end portion of the engaging portion and that is inserted into the recess when the engaging portion is engaged in the first engaged portion or the second engaged portion; and
a switch that changes a position of the projection between a projected position and a retracted position.

6. The tonneau cover unit according to claim 5, wherein;
the recess of the engaged portion is formed by grooving the engaged portion outward in a lateral direction of the vehicle.

7. The tonneau cover unit according to claim 1, wherein;
an opening/closing board is provided at a predetermined position of a face of the board, which faces a rear of the vehicle when the engaging portion is engaged in the second engaged portion; and
the opening/closing board is opened up to a position at which the opening/closing board forms a predetermined angle with respect to the face of the board.

8. The tonneau cover unit according to claim 1, wherein an accessory, which holds luggage or over which luggage is hooked, is provided at a predetermined position of a face of the board, which faces a rear of the vehicle when the engaging portion is engaged in the second engaged portion.

9. The tonneau cover unit according to claim 1, wherein;
a housing space is formed within the board;
the housing space opens at a face of the board, which faces a rear of the vehicle when the engaging portion is engaged in the second engaged portion; and
a lid that opens and closes an opening of the housing space is provided to the face of the board.

10. A tonneau cover unit, comprising:
a tonneau cover that covers a luggage floor which is formed on a rear side within a vehicle;
a board that is fitted to an end portion of the tonneau cover, and that is provided with an engaging portion; and
a rail along which the engaging portion of the board slides in a longitudinal direction of the vehicle,
wherein the rail has:
a first engaged portion in which the engaging portion is engaged and that locks the board with the board kept substantially parallel to the luggage floor when the engaging portion is engaged in the first engaged portion; and
a second engaged portion which is formed at a position that deviates from the first engaged portion in the longitudinal direction of the vehicle, and in which the engaging portion is engaged, and that locks the board with the board kept substantially upright at a predetermined angle with respect to the luggage floor when the engaging portion is engaged in the second engaged portion,
wherein an orientation of the board when the engaging portion is engaged in the first engaged portion differs from an orientation of the board when the engaging portion is engaged in the second engaged portion,
the engaging portion is a projection piece that projects from an end portion of the board toward a vehicle inner wall face in which the rail is formed,
the rail is a groove in which the projection piece is placed and along which the projection piece slides; and
the second engaged portion includes:
a step portion that is formed by grooving a side face of the groove, at a middle portion of the rail, by one step in a height direction of the vehicle, and that has a size sufficiently large for a width of the projection piece in a direction substantially parallel to the board; and
a longitudinal groove that is formed by further grooving a part of the step portion, and that has a width which substantially corresponds to a width of the projection piece in a thickness direction of the board.

11. The tonneau cover unit according to claim 10, further comprising:
a housing case that is provided at a position which is closer to a front of the vehicle than the rail is, and that retracts the tonneau cover using a predetermined retracting force and houses the tonneau cover.

12. The tonneau cover according to claim 10, wherein;
the first engaged portion is formed at a position that is closer to a rear of the vehicle than the second engaged portion is.

13. The tonneau cover unit according to claim 10, wherein;
an opening/closing board is provided at a predetermined position of a face of the board, which faces a rear of the vehicle when the engaging portion is engaged in the second engaged portion; and
the opening/closing board is opened up to a position at which the opening/closing board forms a predetermined angle with respect to the face of the board.

14. The tonneau cover unit according to claim 10, wherein an accessory, which holds luggage or over which luggage is hooked, is provided at a predetermined position of a face of the board, which faces a rear of the vehicle when the engaging portion is engaged in the second engaged portion.

15. The tonneau cover unit according to claim 10, wherein;
a housing space is formed within the board;
the housing space opens at a face of the board, which faces a rear of the vehicle when the engaging portion is engaged in the second engaged portion; and
a lid that opens and closes an opening of the housing space is provided to the face of the board.

16. The tonneau cover unit according to claim 10, wherein the projection piece is chamfered.

17. The tonneau cover unit according to claim 10, wherein the vehicle-front-side end portion of the projection piece is tapered.

18. The tonneau cover unit according to claim 10, wherein;
at least one of the first engaged portion and the second engaged portion has a recess that is formed by grooving the engaged portion outward in a lateral direction of the vehicle; and
the board has:
a projection that is provided to an end portion of the engaging portion and that is inserted into the recess when the engaging portion is engaged in the first engaged portion or the second engaged portion; and
a switch that changes a position of the projection between a projected position and a retracted position.

19. The tonneau cover unit according to claim 18, wherein;
the recess of the engaged portion is formed by grooving the engaged portion outward in a lateral direction of the vehicle.

20. The tonneau cover unit according to claim 10, wherein;
the first and second engaged portions are formed within which a vehicle-rear-side pillar of the vehicle is provided in a longitudinal direction of the vehicle.

21. A tonneau cover unit, comprising:
a tonneau cover that covers a luggage floor which is formed on a rear side within a vehicle;
a board that is fitted to an end portion of the tonneau cover, and that is provided with an engaging portion; and
a rail along which the engaging portion of the board slides in a longitudinal direction of the vehicle,
wherein the rail has:
a first engaged portion that locks the board with the board kept substantially parallel to the luggage floor when the engaging portion is engaged in the first engaged portion; and
a second engaged portion that locks the board with the board kept substantially upright at a predetermined angle with respect to the luggage floor when the engaging portion is engaged in the second engaged portion, wherein:
the engaging portion is a projection piece that projects from an end portion of the board toward a vehicle inner wall face in which the rail is formed;
the rail is a groove in which the projection piece is placed and along which the projection piece slides; and
the second engaged portion includes:
a step portion that is formed by grooving a side face of the groove, at a middle portion of the rail, by one step in a height direction of the vehicle, and that has a size sufficiently large for a width of the projection piece in a direction substantially parallel to the board; and a longitudinal groove that is formed by further grooving a part of the step portion, and that has a width which substantially corresponds to a width of the projection piece in a thickness direction of the board.

22. The tonneau cover unit according to claim 21, wherein the projection piece is chamfered.

23. The tonneau cover unit according to claim 21, wherein a vehicle-front-side end portion of the projection piece is tapered.

24. The tonneau cover unit according to claim 21, wherein;

at least one of the first engaged portion and the second engaged portion has a recess that is formed by grooving the engaged portion in a direction substantially perpendicular to a direction in which the engaging portion slides; and the board has:

a projection that is provided to an end portion of the engaging portion and that is inserted into the recess when the engaging portion is engaged in the first engaged portion or the second engaged portion; and a switch that changes a position of the projection between a projected position and a retracted position.

25. The tonneau cover unit according to claim 24, wherein;

the recess of the engaged portion is formed by grooving the engaged portion outward in a lateral direction of the vehicle.

26. The tonneau cover unit according to claim 21, wherein;

an opening/closing board is provided at a predetermined position of a face of the board, which faces a rear of the vehicle when the engaging portion is engaged in the second engaged portion; and the opening/closing board is opened up to a position at which the opening/closing board forms a predetermined angle with respect to the face of the board.

27. The tonneau cover unit according to claim 21, wherein an accessory, which holds luggage or over which luggage is hooked, is provided at a predetermined position of a face of the board, which faces a rear of the vehicle when the engaging portion is engaged in the second engaged portion.

28. The tonneau cover unit according to claim 21, wherein;

a housing space is formed within the board;

the housing space opens at a face of the board, which faces a rear of the vehicle when the engaging portion is engaged in the second engaged portion; and a lid that opens and closes an opening of the housing space is provided to the face of the board.

* * * * *